United States Patent Office 3,317,274
Patented May 2, 1967

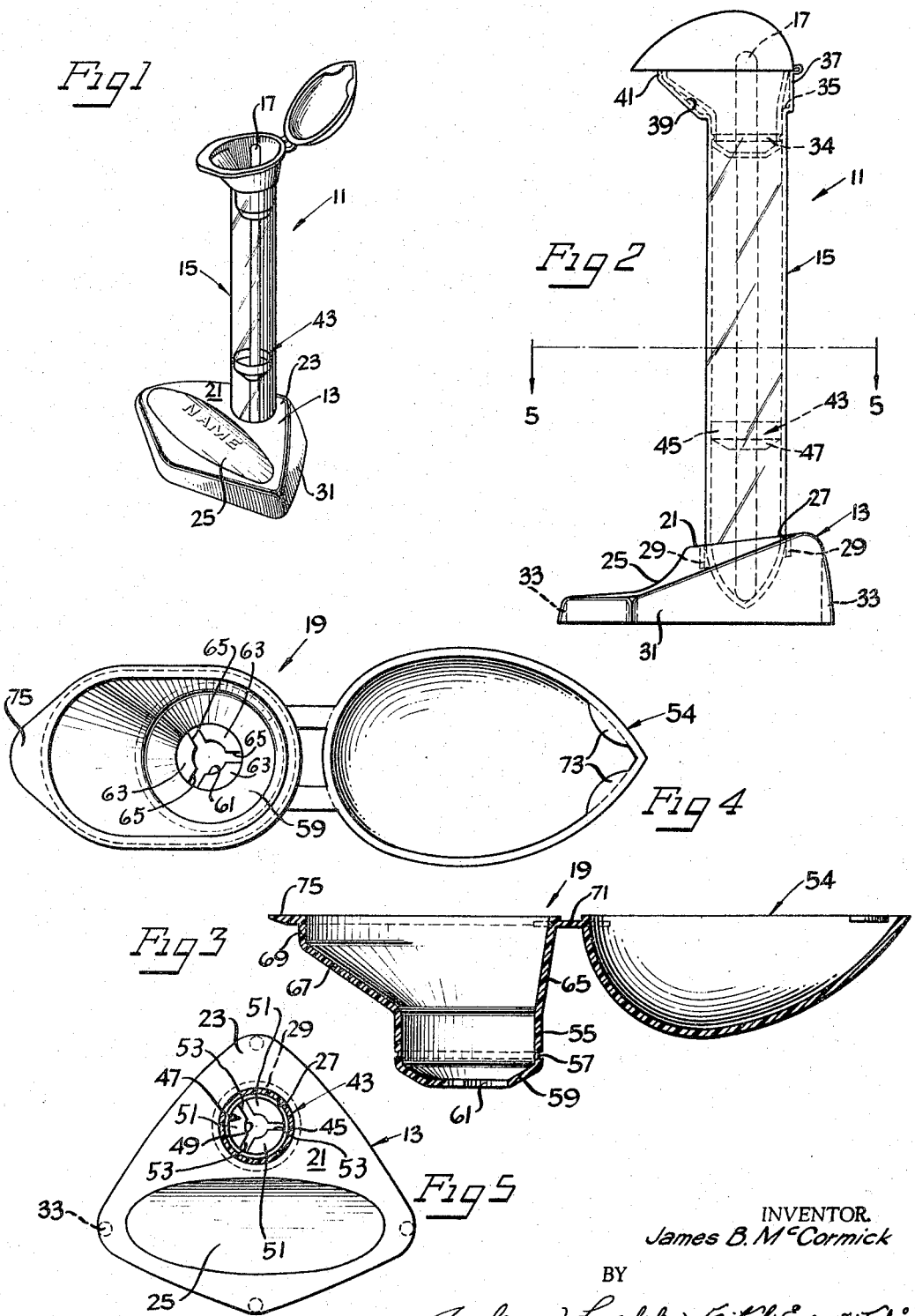

3,317,274
DEVICE FOR SUPPORTING A CLINICAL THERMOMETER
James B. McCormick, La Grange, Ill., assignor, by mesne assignments, to Miles Laboratories, Inc., Elkhart, Ind., a corporation of Indiana
Filed May 22, 1963, Ser. No. 282,397
3 Claims. (Cl. 21—87)

This invention relates to devices adapted to support a clinical thermometer.

It is conventional hospital procedure to record the temperatures of patients interned therein at given intervals throughout the day. Normally, this is accomplished by a nurse who tours a given section or ward of the hospital and records the temperatures of all of the patients located therein. Such a procedure, of course, requires the use of a separate thermometer for each patient, and the nurse generally utilizes a cart on which are carried a large number of thermometers supported in beakers or jars of alcohol, as well as additional beakers to receive the thermometers after they are used. The thermometers, as well as the beakers in which they are carried, are subsequently sterilized and washed.

The above-referred-to procedure is not completely satisfactory. In the first place, the sterilization of a large number of thermometers in preparation for each periodic tour of the ward or section is time consuming. Moreover, if the sterilization is not performed properly, there is a definite risk that communicable disease bacteria will be transferred between patients, this danger being especially formidable with respect to staphylococcus-type bacteria and their occasional immunity to sterilization techniques. Also, since the sterile and contaminated thermometers must be transported on the same vehicle, be it a cart or tray, there is some danger that the nurse will inadvertently intermix the two.

Furthermore, when thermometers are distributed and collected as above, they are normally kept in a central location in a particular section of the hospital in preparation for the next tour. Consequently, a thermometer is not available in proximity to each patient. Accordingly, it is inconvenient to take the temperature of any individual patient at a time which does not coincide with the regular ward tour.

In accordance with the present invention, a device is provided which is adapted to support a thermometer in a liquid chemical, and which is itself adapted to be supported on a bedside table or the like. Accordingly, each individual patient is furnished a given thermometer which is used to record his temperature for the duration of his internment in the hospital, and this thermometer is always conveniently located adjacent the patient's bedside. The maintenance of a thermometer in proximity to the patient eliminates the necessity of bringing the thermometer to the patient and, since each thermometer is utilized for only one patient, it is not necessary to sterilize it each time it is used, the liquid chemical being sufficient to inhibit the growth of bacteria.

The principal object of the invention is to provide an improved device for supporting a clinical thermometer.

Another object of the invention is to provide a device for supporting a clinical thermometer in a liquid chemical in a manner which will prevent the chemical from being spilled if the device is overturned.

A further object of the invention is to provide an improved device for supporting a clinical thermometer in a sterile condition, which device can be manufactured at a low cost and which can therefore be destroyed as economically as it can be sterilized and prepared for reuse.

A still further object of the invention is to provide a device which is adapted to support a clinical thermometer in a manner which will protect the thermometer from breakage if the device is overturned.

Other objects and advantages of the invention will become apparent with reference to the following description and the accompanying drawings:

FIGURE 1 is a perspective view of the device showing various of the features of the invention;
FIGURE 2 is an enlarged elevational view of the device of FIGURE 1;
FIGURE 3 is an enlarged sectional elevational view of a portion of the device of FIGURE 1;
FIGURE 4 is a plan view of the portion of the device shown in FIGURE 3; and
FIGURE 5 is a sectional plan view taken along line 5—5 of FIGURE 2.

Very generally, a device 11 is shown in the illustrated embodiment of the invention and comprises a base 13 which is adapted to support a tubular member or tube 15 in an upright position. The tubular member 15, which is open at its upper end and closed at its lower end, is adapted to hold a quantity of liquid chemical and to receive and support a clinical thermometer 17 in upright disposition. A member 19 is carried adjacent the upper end of the tube and is adapted to retain the thermometer as well as the liquid chemical within the tube.

More specifically, the base 13 is in the shape of a hollow inverted dish which is preferably formed of a plastic or other inexpensive material so as to be economical to manufacture. The base, as well as the remainder of the device, can thus be furnished to the hospital at a low cost and disposed of after use, thereby eliminating the task of sterilization for reuse.

The base 13 comprises a top wall 21 which is somewhat triangular in appearance, but which is actually quadrilateral and defined by a pair of rearwardly facing side edges disposed at an acute angle to one another to form an apex 23, and by a pair of forward side edges disposed opposite the apex at an obtuse angle to one another. An elongated concave depression 25 is provided in the top wall intermediate the forward ends of the rearward edges to provide a convenient surface on which the name of the patient can be easily imprinted, or which will bear a tape (not shown) which is so imprinted. The top wall is further provided with a hole 27 adjacent the apex 23 to receive the lower end of the tubular member 15. The hole 27 is encircled by a cylindrical sleeve 29 which depends from the lower surface of that portion of the top wall peripheral to the hole 27.

The top wall of the base is supported relative to a flat surface, such as the upper surface of a bedside table, by a flange 31 which depends from its periphery, the flange being of gradually decreasing height from the apex 23 to the forward edge of the base so as to thereby provide the upper wall with a downward forward slope. Each corner of the interior of the base is provided with a reinforcement in the form of an upright post 33, the lower ends of each of which engage the surface supporting the base and thereby stabilize the base.

The tubular member or tube 15 is preferably formed of a transparent plastic material which will render it manufacturable at a low cost and thus economically disposable after it has been used for a single patient. The lower end of the tube is tapered to define a rather sharply curved surface terminating in a slightly rounded point, the inner surface of which provides a cradle on which the lower end or bulb of a thermometer may rest.

The outer diameter of the body of the tube is slightly greater than the inner diameter of the sleeve 29 of the base. Accordingly, the tapered portion of the lower end of the tube can be wedged within the sleeve, thus securing the tube to the base.

The inner surface of the wall of the upper portion of the tube is provided with a narrow rib 34 which serves to secure the retainer 19 in place, and the upper end of the tube is formed so as to provide a wide mouth which facilitates the insertion of a thermometer into the tube, and which also facilitates the initial placing of a liquid in the tube. More specifically, the walls of the tubular member project laterally outwardly a short distance adjacent the upper end of the tube to form a ledge 35. A wall 37 projects upwardly from the ledge and for approximately one-half its circumference is generally parallel to the longitudinal axis of the tube. For the remainder of its circumference, the wall 37 is flared outwardly to provide an inclined upwardly facing generally flat surface 39 having an upstanding arcuate rim 41 integral with its forward edge. The upper edge of the mouth of the tube defines a plane generally normal to the longitudinal axis of the tube.

As has already been mentioned, a thermometer is supported within the tube in an upright disposition and in generally coaxial relation to the tube. Preferably, a liquid chemical is provided in the lower end of the tube in surrounding relation to the lower end of the thermometer, a chemical such as an alcohol being commonly used because of its ability to inhibit the growth of bacteria. The alcohol or other liquid is retained in the lower end of the tube by a valve member 43 which also engages the thermometer adjacent its lower end and serves to position it centrally of the tube. If the device is overturned, as by inadvertence or carelessness, the valve absorbs any shock and, in addition, prevents the thermometer as well as the alcohol from being displaced from the tube.

The valve member 43 comprises generally a cylindrical band 45 of limited width which is closed at its lower end by a circular conically-shaped portion 47 having a central lower opening 49 within which are disposed three flat ring segments 51 spaced to provide three radially projecting slots 53 separated by approximately 120°. The opening defined by the ring segments 51 is of a diameter slightly less than the diameter of a thermometer; however, the ring segments are sufficiently flexible so as to be displaced slightly as a thermometer is inserted. When a thermometer is disposed within the opening 49, the edges of the ring segments 51 engage its side walls and hold it securely in place. Additionally, the ring segments serve to wipe any liquid from the thermometer as it is withdrawn from the tube.

It has been found that when the central opening 49 and slots 53 projecting radially therefrom are of a minimum size, liquid in the tube will not pass through the opening, either with or without a thermometer disposed therein, presumably because of the surface tension of the liquid surrounding the opening and the absence of sufficient air pressure within the tube to overcome the said surface tension. This condition has been found to exist when the opening defined by the ring segments has a diameter of approximately 4 millimeters, and the slots have a length of approximately 2 millimeters and a width of approximately 1.5 millimeters, these dimensions varying, of course, depending upon the surface tension of the liquid used. Accordingly, however, even when the device is completely overturned, substantially none of the liquid will leave the tube 15.

The retainer 19 is disposed adjacent the upper end of the tube and serves to support the upper end of the thermometer as well as to insure that any liquid which may by-pass the lower valve member will nevertheless be confined within the tube. In addition, the retainer 19 serves to wipe the thermometer of any liquid which might cling to it, funnel any such liquid back into the tube, and to support a lid 54, hereinafter described. The means 19 therefore performs much of the function of the valve 43 and, if desired, the element 43 may be omitted.

More specifically, the retainer 19 (FIG. 3) includes a generally cylindrical neck portion 55 which is adapted to occupy the upper end of a tube such as, for example, a test tube, but which is particularly adapted to fit within that portion of the tubular member 15 of the device 11 which is immediately below the aforementioned ledge 35. A groove 57 is provided in the outer surface of the neck 55 to receive the rib 34 of the inner wall of the tube, previously described.

Integral with the lower edge of the neck portion 55 is a conically-shaped portion 59 similar to the disk of the lower valve member 43, the portion 59 terminating at its lower end in a central opening 61 within which are disposed three flat ring segments 63 spaced to provide three radially projecting slots 65 separated by approximately 120°. The dimensions of the opening 61 and slots 65 is preferably such as will prevent the loss of liquid therethrough, as previously discussed.

The opening defined by the ring segments 63 is of a diameter slightly less than the diameter of a thermometer; however, as was the case with the valve 43, the segments are sufficiently flexible so as to be displaced by the thermometer. The sloping side walls of the conically-shaped portion 59 serve to funnel through the opening any liquid which may drip from the thermometer, and also facilitate the insertion of the end of the thermometer into the tube.

Integral with the upper edge of the neck portion 55 is an upstanding wall 65 which flares outwardly slightly for about one-half the circumference of the neck, but which is formed into a pronounced flare 67 for the remaining portion of the circumference, this configuration corresponding substantially to that of the upper end of the tube 15. The upper edge of the flare 67 terminates in an upstanding rim 69, as was also the case with the tubular member 15. At least a portion of the flare of the displaceable valve member rests upon the upwardly facing flat surface 39 defined by the flared portion of the tube 15 and serves as a convenient ledge upon which the nurse may momentarily rest the lower end of the thermometer after it has been withdrawn so as to permit any liquid to drain therefrom.

As will be seen in FIGURE 2, the walls of the retainer 19 do not overlie exactly the walls of the upper end of the tube 15. This feature makes it possible, by urging the retainer downwardly into the tube, to wedge it securely in place.

As previously mentioned, the lid 54 is secured to the retainer 19 and serves to shield the upper end of a thermometer from contamination when carried within the device 11, and also serves to protect the upper end of the thermometer should the device be overturned or dropped. The lid is of a generally semi-ellipsoidal shape and is hollow, as can be seen in FIGURE 3. One edge of the lid is attached to the upper edge of the wall 65 by means of flexible strips 71 which serve as hinges. The opposite end of the lid is somewhat pointed and the lower edge thereof is provided with a pair of ears 73 (FIG. 4) which cooperate with a lip 75 projecting laterally from the edge of the rim 69 of the flare 67. The lid is formed of sufficiently flexible material so that the ears 73 may be moved to a position beneath the lip 75 and thus retain the lid in a closed position.

A device has thus been described which is particularly adapted to support a clinical thermometer in a liquid chemical on a supporting surface, the device being so constructed that it can be manufactured economically and thus rendered disposable. The device supports the thermometer in such a manner that if it should be accidently overturned, the liquid will not flow outwardly of the device and the thermometer will be protected from breakage.

While various of the structural features of the invention have been shown and described with respect to one specific embodiment thereof, it should be apparent that various modifications may be made therein without departing from the scope of the invention.

I claim:
1. A retaining member adapted to be carried within one end of an elongated tube closed at its opposite end so as to render the tube capable of supporting a thermometer in a liquid chemical, said retaining member comprising a generally cylindrical hollow neck portion adapted to fit within the mouth of a tube, a hollow conical section integrally connected at its widest cross section with the lower peripheral edge of said neck portion and having inwardly projecting flexible ring segments integrally connected to and spaced about the periphery of its lowest cross section, said spaced ring segments each projecting inwardly and laterally of said neck portion and terminating short of the central axis of said neck portion to define a central opening for receiving and supporting a thermometer in upright position, upstanding surrounding wall means integral with the upper peripheral edge of said neck portion, a portion of said wall means being flared outwardly to provide an inclined upwardly facing ledge, a lip integral with said wall means and projecting laterally and outwardly from the upper edge of said wall means, and a flexible hollow resilient lid having a flexible strip attached to said wall means serving as a hinge, said lid including means engageable with said lip so as to maintain said lid in a position overlying the upper end of a thermometer supported in said central opening.

2. A device for supporting a thermometer in a liquid chemical on a table or the like, which device comprises a base member having a flat underside adapted to rest upon a flat supporting surface and having a surface adapted to carry the printed name of a patient, said base including in its top surface means defining a sleeve, an upright elongated tube adapted to contain a quantity of liquid, one end of said tube being closed and tapered and removably inserted into said sleeve, a portion of the opposite open end of the tube being flared outwardly to define an inclined upwardly facing shoulder, and a retaining member carried by the upper end of the tubular member for supporting the upper end of a thermometer disposed in an upright position within the tubular member and for retaining the liquid therein, said retaining member comprising a generally cylindrical hollow neck portion, a hollow conical section integrally connected at its widest cross section with the lower peripheral edge of said neck portion and having inwardly projecting flexible ring segments integrally connected to and spaced about the periphery of its lowest cross section, said spaced ring segments each projecting inwardly and laterally of said neck portion and terminating short of the central axis of said neck portion to define a central opening for receiving and supporting a thermometer in upright position, upstanding surrounding wall means integral with the upper peripheral edge of said neck portion, a portion of said wall means being flared outwardly to provide an inclined upwardly facing ledge, a lip integral with said wall means and projecting laterally and outwardly from the upper edge of said wall means, and a flexible hollow resilient lid having a flexible strip attached to said wall means serving as a hinge, said lid including means engageable with said lip so as to maintain said lid in a position overlying the upper end of a thermometer supported in said central opening, said retaining member being removably fitted into the open end of said tube with the flared portion of said wall means overlying the upwardly facing shoulder of the open end of said tube and the neck portion of said retaining member being frictionally received within the tube below said upwardly facing shoulder.

3. The device of claim 2 and further comprising a valve member supported within said tube and disposed adjacent the closed end thereof for retaining the liquid in the lower portion of said tube, said valve member including a hollow inwardly sloping conical section having inwardly projecting flat flexible ring segments integrally connected to and spaced about the periphery of its lower end, each of said ring segments of said valve member terminating in its lateral inward extension short of said central axis to define an opening axially aligned with said central opening of said retaining member for receiving and supporting the lower portion of an upright thermometer.

References Cited by the Examiner

UNITED STATES PATENTS

| 578,123 | 3/1897 | Van Gerpen | 15—520 |
| 641,856 | 1/1900 | McK. Gray | 21—90 X |
| 990,415 | 4/1911 | Baker | 21—90 |
| 1,257,060 | 2/1918 | Wright | 21—90 X |
| 1,517,779 | 12/1924 | Glenn | 21—90 X |
| 1,732,467 | 10/1929 | Gregory | 120—108 |
| 2,294,678 | 9/1942 | Martineau | 206—16.6 |
| 2,703,898 | 3/1955 | Kellett | 15—521 X |
| 2,907,489 | 10/1959 | Taylor | 220—38.5 X |
| 3,009,217 | 11/1961 | Weiner | 21—82 |

FOREIGN PATENTS

| 51,369 | 12/1911 | Austria. |
| 9,311 | 1897 | Great Britain. |

MORRIS O. WOLK, *Primary Examiner.*

J. ZATARGA, *Assistant Examiner.*